(12) United States Patent
Belton

(10) Patent No.: US 8,455,128 B2
(45) Date of Patent: Jun. 4, 2013

(54) BATTERY SYSTEM FOR ELECTRIC MOTORCYCLE

(75) Inventor: Brian Belton, Rancho Dominguez, CA (US)

(73) Assignee: U.S. Alternative Energy, LLC, Congers, NY (US)

( * ) Notice: Subject to any disclaimer, the term of this patent is extended or adjusted under 35 U.S.C. 154(b) by 681 days.

(21) Appl. No.: 12/690,042

(22) Filed: Jan. 19, 2010

(65) Prior Publication Data

US 2011/0177371 A1  Jul. 21, 2011

(51) Int. Cl.
*H01M 2/10* (2006.01)
*B60R 16/04* (2006.01)

(52) U.S. Cl.
USPC .............. 429/98; 429/100; 429/99; 429/96; 180/68.5

(58) Field of Classification Search
USPC ................... 429/96–100; 180/68.5
See application file for complete search history.

(56) References Cited

U.S. PATENT DOCUMENTS

| | | | |
|---|---|---|---|
| 403,990 A | 5/1889 | Coxe | |
| 5,255,733 A | 10/1993 | King | |
| 5,477,936 A * | 12/1995 | Sugioka et al. | 429/148 |
| 5,613,569 A * | 3/1997 | Sugioka et al. | 429/99 |
| 5,965,996 A * | 10/1999 | Arledge et al. | 320/116 |
| 6,047,786 A | 4/2000 | Stevenson | |
| 6,199,651 B1 | 3/2001 | Gay | |
| 6,199,652 B1 | 3/2001 | Mastroianni | |
| 6,326,765 B1 | 12/2001 | Hughes | |
| 6,724,165 B2 | 4/2004 | Hughes | |
| 7,210,548 B2 * | 5/2007 | Yonehana et al. | 180/68.5 |
| 7,255,191 B2 | 8/2007 | Baldwin | |
| 2002/0070063 A1 * | 6/2002 | Tsai | 180/68.5 |
| 2005/0140114 A1 | 6/2005 | Lederer | |
| 2005/0146207 A1 | 7/2005 | Wagner | |
| 2008/0131764 A1 | 6/2008 | Saiki | |
| 2010/0078249 A1 * | 4/2010 | Nishiura et al. | 180/220 |

FOREIGN PATENT DOCUMENTS

JP  05105144 A  *  4/1993
JP  07017265 A  *  1/1995

OTHER PUBLICATIONS

Machine translation for Takahashi et al., JP 05-105144 A.*
Machine translation for Kawachi, JP 07-017265 A.*

* cited by examiner

*Primary Examiner* — Edu E Enin-Okut
(74) *Attorney, Agent, or Firm* — Mark Terry

(57) ABSTRACT

A battery system for an electric motor of an electric motorcycle is disclosed. The battery system includes a motorcycle frame defining an interior volume and a plurality of battery cells situated substantially within the interior volume of the frame, wherein each cell is individually enclosed and individually electrically coupled with the electric motor. The battery system further includes at least one housing member removably coupled with an exterior of the frame, wherein the housing member is perforated so as to allow airflow into the interior volume of the frame and wherein removal of the housing member provides unfettered access to the cells, which can be individually removed without requiring additional disassembly. The battery system further includes at least one fastener for fastening the housing member to the frame, wherein removal of the at least one fastener results in decoupling of the housing member from the frame.

19 Claims, 6 Drawing Sheets

BATTERY SYSTEM FOR ELECTRIC MOTORCYCLE

CROSS-REFERENCE TO RELATED APPLICATIONS

Not Applicable.

STATEMENT REGARDING FEDERALLY SPONSORED RESEARCH OR DEVELOPMENT

Not Applicable.

INCORPORATION BY REFERENCE OF MATERIAL SUBMITTED ON A COMPACT DISC

Not Applicable.

FIELD OF THE INVENTION

This invention relates to the filed of battery systems, and more particularly to battery systems for electric motor vehicles.

BACKGROUND OF THE INVENTION

Various types of battery packs for electric vehicles have been commercially available for years. A standard battery pack for an electric vehicle includes a container that houses multiple battery cells. The container also houses conductors that wire the battery together, as well as any wiring relays, in addition to the battery cells. Because of the presence of sensitive electrical components, the interior of a standard battery pack container must be free of water, debris and other elements that can cause electrical disturbances or electrical shorts. As such, a standard battery pack container is typically air-tight and water resistant so as to protect the battery cells from damaging external elements.

One of the main drawbacks of conventional battery packs for electric vehicles, however, is the inability to easily gain access to the individual battery cells within the battery pack container. Conventional battery packs are sealed tight and are not built to allow the container to be opened to gain access to the battery cells inside. This can become a problem when individual battery cells within the battery pack container become damaged or malfunctions. Under the conventional configuration, when a single battery cell in the battery pack container becomes damaged or expended, the consumer's inability to replace the sole damaged battery cell requires the consumer to discard the entire battery pack and purchase a new one. This is wasteful and time-consuming.

The above drawback is compounded in the case of an electric motor-powered motorcycle, since the amount of space available in a motorcycle frame is limited. Typically, the main locomotive components of a motorcycle, whether electric-powered or internal combustion engine-powered, are located in an interior volume of the motorcycle frame. This includes the motor, the transmission (if any), the battery pack and the like. In an electric motor-powered motorcycle, the battery pack is wedged within a relatively small space available in the frame of the motorcycle. This configuration limits the consumer's ability to quickly and easily access the battery pack and the battery cells within the battery pack.

Yet another drawback of conventional battery packs for electric vehicles is heat dissipation. Battery packs generate a considerable amount of heat during operation due to the high amounts of current drawn from the packs by the electric motor. Because conventional battery packs are sealed tight and are not built to be easily opened, there is little or no air flow within the battery pack, thereby causing heat to build up within the battery pack during operation. This can be problematic since individual battery cells can become damaged, or their life spans reduced, if they are exposed to exorbitant heat. Operation of a battery cell at high temperatures can also affect the energy efficiency of the battery system.

An additional drawback of conventional battery packs for electric vehicles is the propensity for a sealed pack to retain pressure and debris. Because battery packs generate a considerable amount of heat during operation, an air-tight sealed battery pack that becomes extremely hot can create exorbitant air pressure that cannot be relieved because it is sealed. A sealed container under hazardous amounts of pressure can be dangerous and even lethal to humans. Also, since a conventional battery pack is sealed or nearly sealed, it has the propensity to retain water, condensation, dirt or any other debris that works its way into the container. This can be problematic since individual battery cells can become damaged or short circuited if they are exposed to water, dirt or other debris.

As an example, the commercially available Zero motorcycle, manufactured by Zero Motorcycles, Inc. of Scotts Valley, Calif., utilizes a single, large battery pack comprising a rigid, box-like plastic container that cannot be opened. The container includes a group of battery cells that are wired together in a specific configuration. Specifically, the container includes a set of lithium ion iron phosphate battery cells that together provide 48 volts. As explained above, the main drawback of the Zero's battery pack, besides the relatively low voltage provided, is the inability to easily gain access to the individual battery cells within the container. Thus, the consumer is inhibited from replacing a sole damaged battery cell within the battery pack. Further, the sealed nature of the Zero's battery pack restricts airflow within the battery pack, thereby inhibiting heat dissipation.

Various U.S. patents disclose various frames that allow various forms of access to battery packs for scooters, such as U.S. Pat. Nos. 6,047,786 and 7,255,191. The scooters described in the aforementioned patents, however, require significant disassembly of the scooter body in order to gain access to the battery pack within the scooter. Thus, the aforementioned patents do not disclose adequate solutions to the problem of allowing quick and easy access to individual battery cells within the battery pack of an electric motorcycle. The aforementioned patents also do not disclose adequate solutions to the problem of heat dissipation with the battery pack. Likewise, U.S. Pat. Nos. 3,983,952 and 5,613,569 disclose electric motorcycles including battery systems, but access to the battery pack requires significant disassembly of the vehicle body and access to individual battery cells within the battery pack is limited.

Therefore, a need exists to overcome the problems with the prior art as discussed above, and particularly for a more efficient battery system for an electric motorcycle.

SUMMARY OF THE INVENTION

Briefly, according to an embodiment of the present invention, a battery system for an electric motor of an electric motorcycle is disclosed. The battery system includes a motorcycle frame defining an interior volume and a plurality of battery cells situated substantially within the interior volume of the frame, wherein each battery cell is individually enclosed and individually electrically coupled with the electric motor of the electric motorcycle. The battery system further includes at least one housing member removably coupled with an exterior of the frame, wherein the at least one housing member is perforated so as to allow airflow into the interior volume of the frame and wherein removal of the at least one housing member provides unfettered access to a plurality of battery cells such that each of the plurality of battery cells can be individually removed without requiring additional disassembly of the electric motorcycle. The battery system further includes at least one fastener for fastening the at least one housing member to the frame, wherein removal of the at least one fastener results in decoupling of the at least one housing member from the frame.

In another embodiment of the present invention, a battery system for an electric motor of an electric motorcycle is disclosed. The battery system includes a motorcycle frame defining an interior volume and a plurality of battery cells situated substantially within the interior volume of the frame, wherein each battery cell is individually enclosed and individually electrically coupled with the electric motor of the electric motorcycle. The battery system further includes a battery management system electrically coupled with the plurality of battery cells wherein the battery management system monitors metadata of each of the plurality of battery cells. The battery system further includes at least one housing member removably coupled with an exterior of the frame, wherein the at least one housing member is perforated so as to allow airflow into the interior volume of the frame and wherein removal of the at least one housing member provides unfettered access to a plurality of battery cells such that each of the plurality of battery cells can be individually removed without requiring additional disassembly of the electric motorcycle. The battery system further includes at least one fastener for fastening the at least one housing member to the frame, wherein removal of the at least one fastener results in decoupling of the at least one housing member from the frame.

The foregoing and other features and advantages of the present invention will be apparent from the following more particular description of the preferred embodiments of the invention, as illustrated in the accompanying drawings.

BRIEF DESCRIPTION OF THE DRAWINGS

The subject matter, which is regarded as the invention, is particularly pointed out and distinctly claimed in the claims at the conclusion of the specification. The foregoing and other features and also the advantages of the invention will be apparent from the following detailed description taken in conjunction with the accompanying drawings. Additionally, the left-most digit of a reference number identifies the drawing in which the reference number first appears.

DETAILED DESCRIPTION

The present invention provides a battery system for the electric motor of an electric motorcycle. The battery system includes a set of individually packaged and individually connected battery cells housed within an interior volume defined by the motorcycle frame. One or more housing members, comprising planar panels, are coupled to the exterior of the frame so as to house and/or protect the battery cells within the frame. The housing members are perforated and are removably coupled along their outer perimeter to the frame, such as with threaded bolts. The purpose of the removable nature of the housing members is to allow a user the ability to easily gain access to the individual battery cells housed within the motorcycle frame without requiring any additional disassembly of the motorcycle. Thus, when individual battery cells become damaged or malfunction, the consumer has the ability to replace the sole damaged battery cell with a minimal amount of disassembly. This feature of the present invention is advantageous as it increases the usability of the electric motorcycle and simplifies the maintenance of the electric motorcycle, while also reducing the costs of upkeep.

Note also that the present invention provides a battery system for an electric motorcycle including one or more housing members comprising planar panels that are perforated. The purpose of the perforated nature of the housing members is to allow for greater volume of air to pass through the interior volume of the frame, thereby increasing the heat dissipation and cooling capacity of the battery system. Because of the increased air flow among the battery cells, heat is not allowed to build up to dangerous levels within the battery cells during operation. This reduces heat damage to the battery cells and increases their life spans. Further, operation of a battery cell at peak temperatures enhances the energy efficiency of the battery system.

An additional purpose of the perforated nature of the housing members is to allow dirt, water, condensation or other debris to spill or fall out of the area in which the battery cells are located. Because of the open-air nature of the placement of the battery cells, water and debris is not retained within the area in which the battery cells are placed. This reduces the chances of damage to the battery cells due to water or debris.

Figure 1:
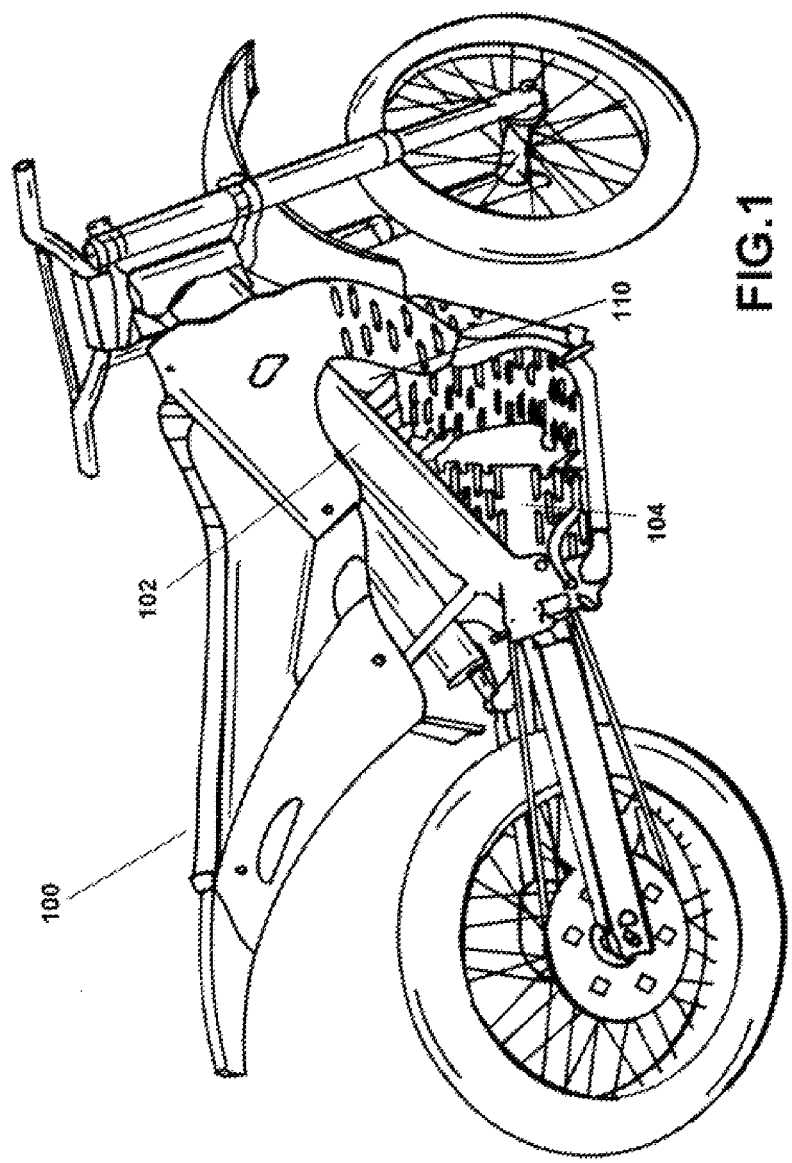
FIG. 1 is an illustration of a side view of an electric motorcycle including a battery system, according to one embodiment of the present invention.

FIG. 1 is an illustration of a side view of an electric motorcycle 100 including a battery system 110, according to one embodiment of the present invention. The electric motorcycle 100 further comprises the motorcycle frame 102, which provides the main structural components of the electric motorcycle 100, and the electric motor 104, which comprises the main locomotive force of the electric motorcycle 100.

Figure 2:
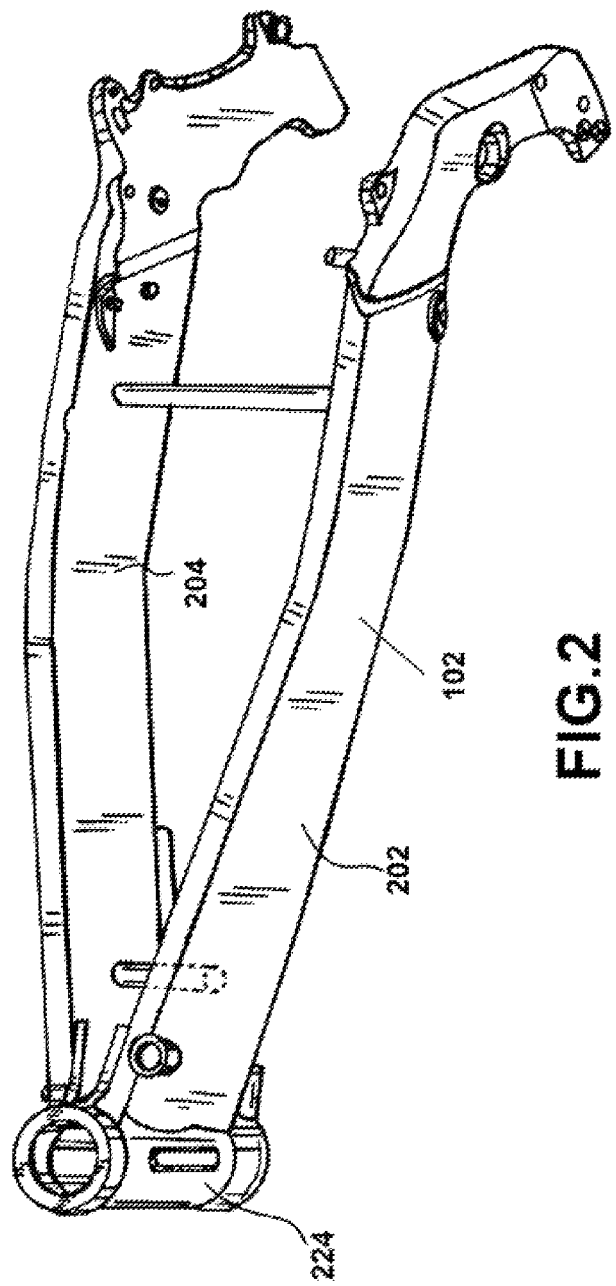
FIG. 2 is an illustration of a more detailed perspective view of the frame of the electric motorcycle, according to one embodiment of the present invention.

FIG. 2 is an illustration of a more detailed perspective view of the frame 102 of the electric motorcycle 100 of FIG. 1, according to one embodiment of the present invention. FIG. 2 shows that the motorcycle frame 102 may comprise a dual-bar configuration wherein a left-side bar 202 is mirrored by a right-side bar 204. The left-side bar 202 and the right-side bar 204 are each coupled on one end with the stem 224 of the electric motorcycle 100 so as to be structurally integrated with the stem 224. The method of coupling of the bars 202, 204 with the stem 224 may be welding or the bars 202, 204 may be structurally formed with the stem 224, such as by machining a single metallic unit, metal casting the frame 102 as a single unit or by weaving carbon fibers into a single unit comprising the frame 102.

Figure 3:
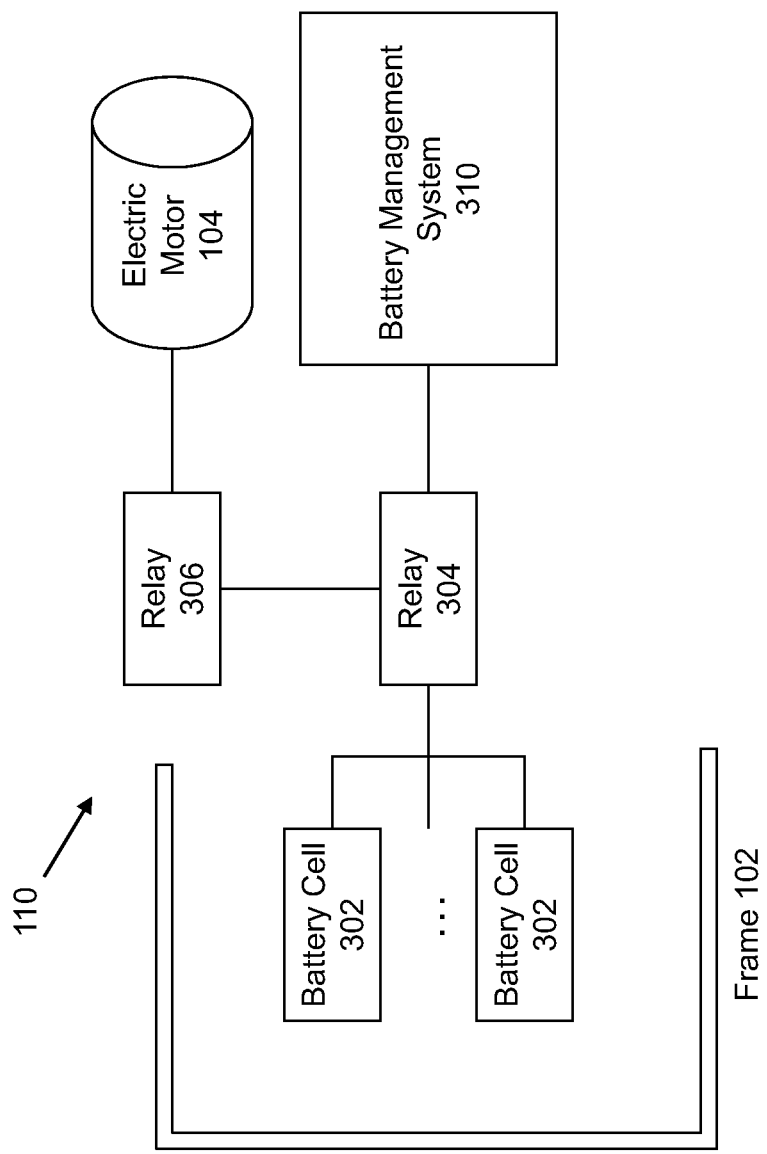
FIG. 3 is a block diagram depicting the main components of the battery system of the electric motorcycle, according to one embodiment of the present invention.

FIG. 3 is a block diagram depicting the main components of the battery system 110 of the electric motorcycle 100, according to one embodiment of the present invention. The battery system 110 includes a plurality of battery cells 302 housed within an interior volume defined by the frame 102 of the electric motorcycle 100, wherein each battery cell 302 may be individually packaged and individually electrically connected. Each battery cell 302 comprises a single electrochemical cell that is wrapped or packaged in an inert material, such as heavy-duty plastic. Further, each battery cell 302 may include two terminals—a positive terminal and a negative terminal. In one embodiment of the present invention, each battery cell 302 comprises a rectangular-shaped element including a similarly-shaped housing having a positive and negative terminal. Each battery cell 302 is individually electrically coupled with the battery management system 310 via one or more relays 304. Further, each battery cell 302 is individually electrically coupled with the electric motor 104 of the electric motorcycle 100 via one or more relays 306. In another embodiment, battery cells 302 together provide 96 volts to the electric motor 104 of the electric motorcycle 100.

In one embodiment of the present invention, the battery management system 310 is any electronic device that manages each battery cell 302, such as by monitoring its state, calculating secondary data, reporting the data, protecting the battery cell, controlling its environment, and/or balancing the charge in each cell. The battery management system 310 may monitor various aspects of the battery cells 302 as a whole and/or each individual cell, such as voltage, voltage of periodic taps, temperature, air intake temperature, air output temperature, state of charge, the depth of discharge, state of health, airflow and the current in or out. The battery management system 310 may report all of the above metadata to an external device, such as a display, using a communication link, such as a serial communication bus.

The battery management system 310 may also calculate values based on the above metadata, such as maximum charge current as a charge current limit, maximum discharge current as a discharge current limit, total energy delivered since manufacture, total operating time since manufacture. The battery management system 310 may also protect each battery cell 302 by preventing it from operating outside its safe operating area, such as over-current, over-voltage (during charging), under-voltage (during discharging), over-temperature, under-temperature, and over-pressure.

In one embodiment of the present invention, the battery management system 310 may also prevent operation outside each battery cell's 302 safe operating area by including an internal switch (such as a relay or solid state device) which is opened if the battery cell is operated outside its safe operating area or requesting the devices to which the battery cell is connected to reduce its use of the battery cell or even terminate it. The battery management system 310 may also maximize the battery cells' 302 capacity, and to prevent localized under-charging or over-charging, it may actively ensure that all the battery cells 302 are kept at the same state of charge, through balancing. The battery management system 310 may do so by wasting energy from the most charged battery cells, such as by connecting them to a load (such as through passive regulators), shuffling energy from the most charged battery cells to the least charged ones (balancers), and/or reducing the charging current to a sufficiently low level that will not damage fully charged battery cells, while less charged battery cells may continue to charge.

Figure 4:
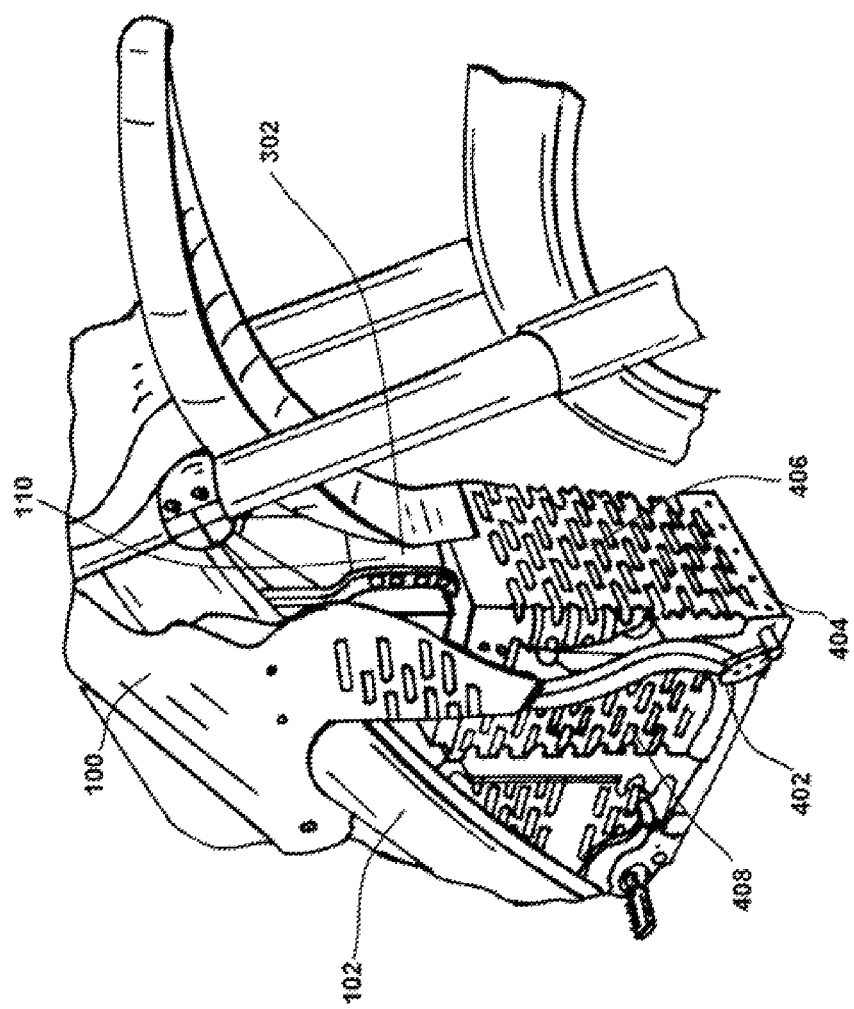
FIG. 4 is an illustration of a more detailed perspective view of the electric motorcycle including a battery system, according to one embodiment of the present invention.

FIG. 4 is an illustration of a more detailed perspective view of the electric motorcycle 100 including a battery system 110, according to one embodiment of the present invention. FIG. 4 shows that frame 102 includes a bottom frame element 402 that extends downwards from frame 102 and then curves back to reconnect with the frame 102. FIG. 4 further shows a bottom tray 404 which serves as a bottom foundation for holding the battery cells 302. Note that frame 102 and elements 402, 404 define an interior volume within the frame 102 for housing the battery cells 302.

FIG. 4 also shows housing member 406, comprising a planar element in a vertical position and arranged facing forward or toward the front of the motorcycle 100. Housing member 406 houses and maintains the battery cells 302 in place, and further provides protection for the battery cells 302. The perforated nature of housing member 406 allows for airflow to enter the interior volume within the frame 102 for housing the battery cells 302. Specifically, the placement of member 406 in a forward-facing fashion allows for increased airflow through the interior volume of the frame 102 when the motorcycle 100 is being driven forward. Note that the placement of member 406 is similar or identical to the placement of a conventional motorcycle radiator, which includes a forward-facing planar element that maximizes the interface between the planar element and the ambient air during operation of the motorcycle. As the motorcycle 100 is driven, air impacts the member 406 directly and in a perpendicular manner. This allows for greater heat dissipation of heat produced by the battery cells 302, thereby allowing the battery cells 302 to cool faster and more efficiently.

FIG. 4 also shows housing member 408, comprising a planar element in a vertical position and arranged facing to the right side of the motorcycle 100. Housing member 408 performs the same functions as housing member 406, housing and maintaining the battery cells 302 in place, and further providing protection for the battery cells 302. The perforated nature of housing member 408 allows for airflow to enter the interior volume within the frame 102, thereby allowing the battery cells 302 to cool faster and more efficiently. Another housing member (not shown), similar to housing member 408, is located on the left side of the motorcycle 100.

Note that the perforated nature of housing members 406, 408 allows dirt, water, condensation or other debris to spill or fall out of the area in which the battery cells 302 are located. Because of the open-air nature of the placement of the battery cells 302, water and debris is not retained within the area in which the battery cells 302 are placed. This reduces the chances of damage to the battery cells 302 due to water or debris.

Figure 5:
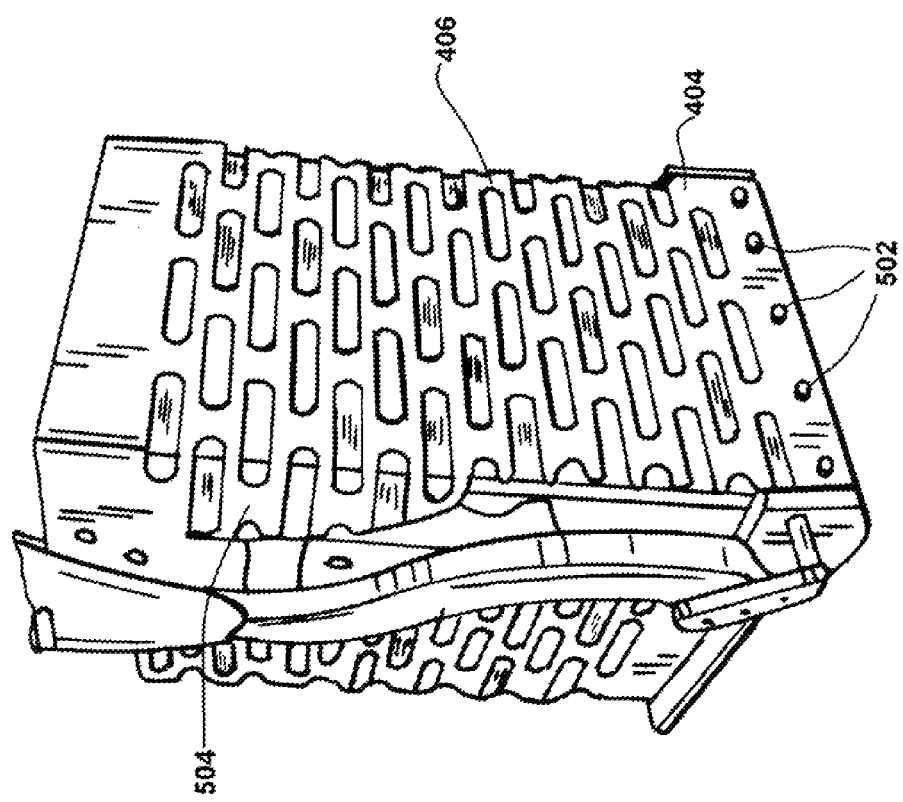
FIG. 5 is an illustration of a more detailed perspective view of the battery system of the electric motorcycle, according to one embodiment of the present invention.

FIG. 5 is an illustration of a more detailed perspective view of the battery system 110 of the electric motorcycle 100, according to one embodiment of the present invention. FIG. 5 shows that housing member 406 is removably coupled to frame element 404 via fasteners 502, which may comprise bolts or screws. Note that fasteners 502 are positioned around at least a portion of the perimeter of housing member 406. As result of the aforementioned arrangement, the housing member 406 can quickly and easily be removed from the frame 102 by unscrewing or removing the fasteners 502. In one embodiment of the present invention, housing member 408 may also be removably coupled to the frame 102 via one or more fasteners. Note that planar housing member 406 may further include a side element 504 that extends perpendicularly from a side of the member 406 towards the battery cells 302.

The purpose of the removable nature of the housing members 406, 408 is to allow a user the ability to easily gain access to the individual battery cells 302 housed within the motorcycle frame 102 without requiring any additional disassembly of the motorcycle 100. Thus, when individual battery cells 302 become damaged or malfunction, the consumer has the ability to replace the sole damaged battery cell with a minimal amount of disassembly. This increases the usability of the electric motorcycle 100 and simplifies the maintenance of the electric motorcycle 100.

Figure 6:
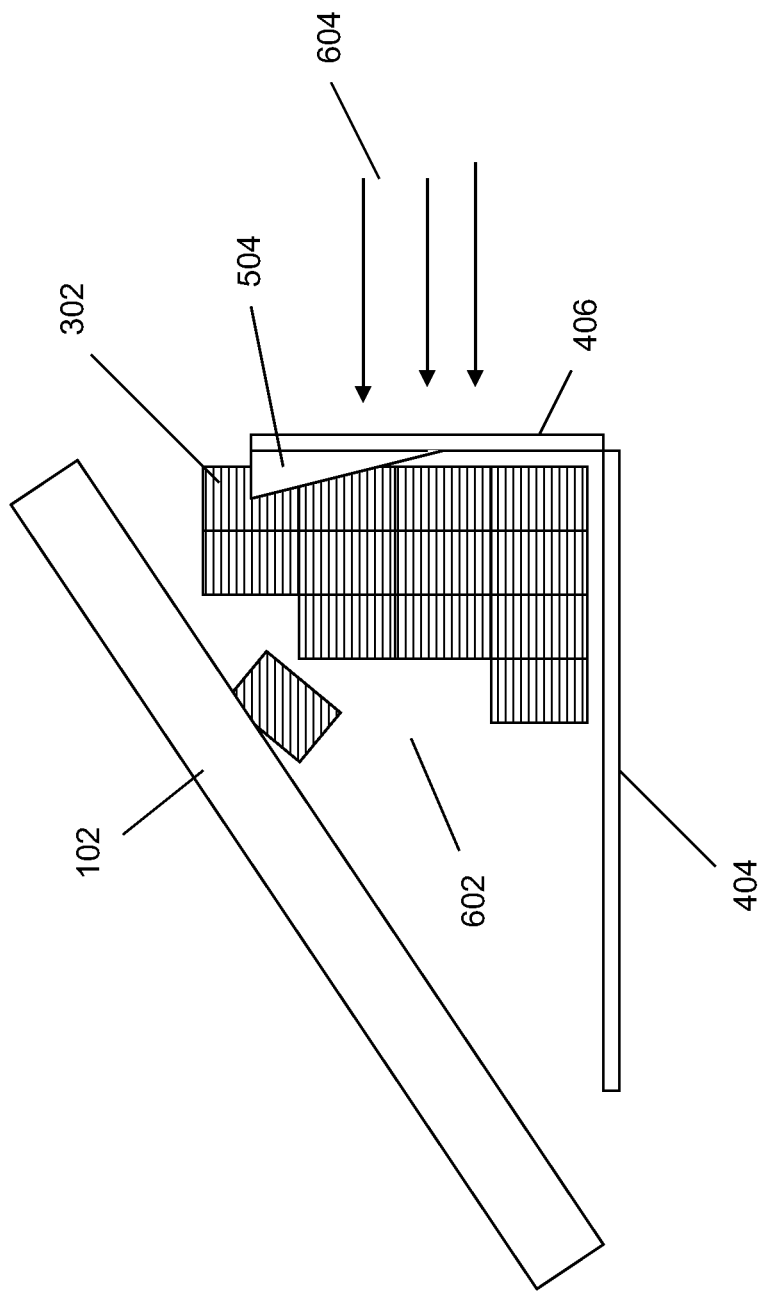
FIG. 6 is an illustration of a side view of certain components of the battery system of the electric motorcycle, according to one embodiment of the present invention.

FIG. 6 is an illustration of a side view of certain components of the battery system 110 of the electric motorcycle 100, according to one embodiment of the present invention. For simplicity, FIG. 6 shows only certain components of the present invention. FIG. 6 shows that frame 102 includes a bottom tray 404 which serves as a bottom foundation for holding the battery cells 302. Planar housing element 406, coupled to tray 404, is positioned vertically and in a forward-facing fashion. Note that frame 102 and elements 406, 404 define an interior volume 602 within the frame 102 for housing the battery cells 302. Note that planar housing member 406 may further include a side element 504 that extends perpendicularly from a side of the member 406 towards the battery cells 302.

Note that the placement of member 406 in a forward-facing fashion allows for increased airflow 604 through the interior volume 602 of the frame 102 when the motorcycle 100 is being driven forward. This feature maximizes the interface between the planar element 406 and the ambient air 604 during operation of the motorcycle 100. As the motorcycle 100 is driven, air 604 impacts the member 406 directly and in a perpendicular manner. This allows for greater heat dissipation of heat produced by the battery cells 302, thereby allowing the battery cells 302 to cool faster and more efficiently.

The components of the electric motorcycle 100 can be manufactured from a variety of materials using a variety of methods. In one embodiment of the present invention, the components of the electric motorcycle 100, including frame 102 and elements 402, 404, 406, 408 can be manufactured from aluminum or an aluminum alloy. Aluminum can be either non-treated, clear or color anodized. The aluminum alloys are categorized into two types, non-heat-treatable and heat-treatable. Examples of such aluminum alloys are Types 1100, 3003, 5005, 5052, 2024, 6061, and 7075.

In another embodiment of the present invention, the components of the electric motorcycle 100 can be manufactured from hot-forged alloy steel that is oil quenched and tempered for maximum strength and durability. Additionally, the components of the electric motorcycle 100 may include nickel-chrome plating that resists rust. The components of the electric motorcycle 100 can be welded or coupled together using an arc welding process such as heli-arc welding.

The components of the electric motorcycle 100 can further be manufactured using a variety of methods for casting metals. Metal casting involves the shaping of free-flowing liquid metals through the use of dies, molds, or patterns. Common metal casting processes include sand casting, die casting, permanent mold casting, investment casting, centrifugal casting, and lost foam casting. The components of the electric motorcycle 100 can further be manufactured using metal injection molding (MIM) method for preparing metals. MIM is a powder metallurgy process used for manufacturing metal parts. Unlike powder metal, products manufactured by MIM can be case or through hardened, painted, and drilled and tapped.

The components of the electric motorcycle 100 can further be manufactured using a variety of metals, such as ferrous metals and alloys. Ferrous metals and alloys are iron-based materials that are used in a wide variety of industrial applications. Examples include carbon steels, alloy steels, stainless steels, tool steels, cast iron, cast steel, maraging steel, and specialty or proprietary iron-based alloys. The components of the electric motorcycle 100 can further be manufactured using nickel and nickel alloys. Nickel and nickel alloys are non-ferrous metals with high strength and toughness, excellent corrosion resistance, and superior elevated temperature properties.

In another embodiment of the present invention, the components of the electric motorcycle 100, including frame 102 and elements 402, 404, 406, 408, can further be manufactured using carbon fiber, graphite fiber, carbon graphite, which is a material consisting of extremely thin fibers about 0.005-0.010 mm in diameter and composed mostly of carbon atoms. The carbon atoms are bonded together in microscopic crystals that are more or less aligned parallel to the long axis of the fiber. Several thousand carbon fibers are twisted together to form a yarn, which may be used by itself or woven into a fabric. Carbon fiber has many different weave patterns and can be combined with a plastic resin and wound or molded to form composite materials such as carbon fiber reinforced plastic to provide a high strength-to-weight ratio material.

In one embodiment, the frame 102 and elements 402, 404, 406, 408 are composed of a carbon fiber fabric that is warp knitted. Warp knitting is a carbon fiber knitting method in which individual carbon fiber strands zigzag along the length of the carbon fiber fabric, i.e., following adjacent columns of knitting, rather than a single row. Warp knitting carbon fiber increases the strength qualities of carbon fiber fabric, and reduces the amount of carbon fiber needed, thereby resulting in a thinner and lighter fabric while still maintaining strength.

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments. Furthermore, it is intended that the appended claims cover any and all such applications, modifications, and embodiments within the scope of the present invention.

I claim:

1. A battery system for an electric motor of an electric motorcycle, including:
   a motorcycle frame defining an interior volume;
   a plurality of battery cells situated substantially within the interior volume of the frame, wherein each battery cell is individually enclosed and individually electrically coupled with the electric motor of the electric motorcycle;
   a housing member removably coupled with an exterior of the frame, wherein the housing member comprises a substantially planar member situated vertically and in a forward-facing position, such that the plurality of battery cells are positioned directly behind the planar member and a front of the planar member faces a front of the electric motorcycle so as to directly and perpendicularly contact oncoming air when the electric motorcycle is driven, wherein the housing member is perforated so as to allow airflow into the interior volume of the frame and wherein removal of the housing member provides unfettered access to a plurality of battery cells such that each of the plurality of battery cells can be individually removed without requiring additional disassembly of the electric motorcycle, and wherein removal of the housing member comprises removal of an entirety of a forward-facing panel holding the plurality of battery cells; and
   at least one fastener for fastening the housing member to the frame, wherein removal of the at least one fastener results in decoupling of the housing member from the frame.

2. The battery system of claim 1, wherein the motorcycle frame comprises a dual bar configuration comprising a left-side bar and a right-side bar, wherein both bars are coupled at one end to a stem of the frame.

3. The battery system of claim 1, wherein each of the plurality of battery cells comprises a lithium ion battery cell.

4. The battery system of claim 1, wherein the plurality of battery cells cumulatively provide 96 volts.

5. The battery system of claim 1, wherein the housing member comprises a substantially planar member situated vertically and removably coupled with a front side of an exterior of the frame.

6. The battery system of claim 5, wherein the at least one fastener comprises threaded bolts that couples at least a portion of an outer diameter of the housing member to the frame.

7. The battery system of claim 1, wherein the housing member comprises a substantially planar member situated vertically and removably coupled with a left or right side of an exterior of the frame.

8. The battery system of claim 7, wherein the at least one fastener comprises a threaded bolts that couples at least a portion of an outer diameter of the housing member to the frame.

9. The battery system of claim 1, wherein the housing member comprises:
   a substantially planar member situated vertically and in a forward-facing position, such that the plurality of battery cells are positioned directly behind the planar member and a front of the planar member faces a front of the electric motorcycle so as to directly and perpendicularly contact oncoming air when the electric motorcycle is driven, and wherein the housing member is coupled to a front side of the exterior of the frame.

10. A battery system for an electric motor of an electric motorcycle, including:
    a motorcycle frame defining an interior volume;
    a plurality of battery cells situated substantially within the interior volume of the frame, wherein each battery cell is individually enclosed and individually electrically coupled with the electric motor of the electric motorcycle;
    a battery management system electrically coupled with the plurality of battery cells wherein the battery management system monitors metadata of each of the plurality of battery cells;
    a housing member removably coupled with an exterior of the frame, wherein the housing member comprises a substantially planar member situated vertically and in a forward-facing position, such that the plurality of battery cells are positioned directly behind the planar member and a front of the planar member faces a front of the electric motorcycle so as to directly and perpendicularly contact oncoming air when the electric motorcycle is driven, wherein the housing member is perforated so as to allow airflow into the interior volume of the frame and wherein removal of the housing member provides unfettered access to a plurality of battery cells such that each of the plurality of battery cells can be individually removed without requiring additional disassembly of the electric motorcycle, and wherein removal of the housing member comprises removal of an entirety of a forward-facing panel holding the plurality of battery cells; and
    at least one fastener for fastening the housing member to the frame, wherein removal of the at least one fastener results in decoupling of the housing member from the frame.

11. The battery system of claim 10, wherein the motorcycle frame comprises a dual bar configuration comprising a left-side bar and a right-side bar, wherein both bars are coupled at one end to a stem of the frame.

12. The battery system of claim 10, wherein each of the plurality of battery cells comprises a lithium ion battery cell.

13. The battery system of claim 10, wherein the plurality of battery cells cumulatively provide 96 volts.

14. The battery system of claim 10, wherein the metadata of each of the plurality of battery cells comprises at least one of voltage, temperature, state of charge, state of health and a measurement of passing current.

15. The battery system of claim 10, wherein the housing member comprises a substantially planar member situated vertically and removably coupled with a front side of an exterior of the frame.

16. The battery system of claim 15, wherein the at least one fastener comprises a threaded bolts that couples at least a portion of an outer diameter of the housing member to the frame.

17. The battery system of claim 10, wherein the housing member comprises a substantially planar member situated vertically and removably coupled with a left or right side of an exterior of the frame.

18. The battery system of claim 17, wherein the at least one fastener comprises a threaded bolts that couples at least a portion of an outer diameter of the housing member to the frame.

19. The battery system of claim 10, wherein the housing member comprises:
    a substantially planar member situated vertically and in a forward-facing position, such that the plurality of battery cells are positioned directly behind the planar member and a front of the planar member faces a front of the electric motorcycle so as to directly and perpendicularly contact oncoming air when the electric motorcycle is driven, and wherein the housing member is coupled to a front side of the exterior of the frame.

* * * * *